US008019278B2

(12) United States Patent
Baraz et al.

(10) Patent No.: US 8,019,278 B2
(45) Date of Patent: Sep. 13, 2011

(54) WIRELESS COMMUNICATION SYSTEM, PORTABLE RADIO REPEATER AND MAGAZINE THEREFOR

(75) Inventors: Benjamin Baraz, Kfar-Saba (IL); Edward Nemirovsky, Holon (IL); Yona Newman, Ra'Anana (IL)

(73) Assignee: Motorola Solutions, Inc., Schaumburg, IL (US)

( * ) Notice: Subject to any disclaimer, the term of this patent is extended or adjusted under 35 U.S.C. 154(b) by 428 days.

(21) Appl. No.: 12/373,323

(22) PCT Filed: Jul. 13, 2007

(86) PCT No.: PCT/US2007/073420
§ 371 (c)(1),
(2), (4) Date: Jan. 12, 2009

(87) PCT Pub. No.: WO2008/011336
PCT Pub. Date: Jan. 24, 2008

(65) Prior Publication Data
US 2009/0247070 A1    Oct. 1, 2009

(30) Foreign Application Priority Data
Jul. 18, 2006    (GB) .................................. 0614208.7

(51) Int. Cl.
*H04B 7/15* (2006.01)
(52) U.S. Cl. .................................. 455/11.1; 455/575.8
(58) Field of Classification Search ................ 455/11.1, 455/16, 9, 423, 67.11, 575.8, 575.1
See application file for complete search history.

(56) References Cited

U.S. PATENT DOCUMENTS

| 4,152,647 | A | | 5/1979 | Gladden et al. |
| 5,010,583 | A | | 4/1991 | Parken |
| 5,857,144 | A | * | 1/1999 | Mangum et al. ............. 455/11.1 |
| 5,988,431 | A | | 11/1999 | Roe |
| 7,035,587 | B1 | | 4/2006 | Yarkosky |
| 2005/0001720 | A1 | | 1/2005 | Mason |
| 2005/0146432 | A1 | | 7/2005 | Perez Garcia |
| 2006/0046646 | A1 | * | 3/2006 | Couper ........................ 455/11.1 |
| 2006/0098592 | A1 | * | 5/2006 | Proctor, Jr. et al. ........... 370/315 |

FOREIGN PATENT DOCUMENTS
WO    WO2006061254 A1    6/2006

OTHER PUBLICATIONS
PCT Search Report Dated Feb. 14, 2008.
GB Search Report Dated Oct. 13, 2006.

* cited by examiner

*Primary Examiner* — Tu Nguyen
(74) *Attorney, Agent, or Firm* — Anthony P. Curtis

(57) ABSTRACT

A wireless communication system and portable radio repeater are described. The system includes a portable magazine having multiple portable radio repeaters disposed therein. One or more of the repeaters are automatically or manually ejected based on a received signal strength measurement. Once ejected, each repeater communicates from the ejected location, automatically switching between passive and active receive modes based on received signal strength. The repeater has a sensor to transmit environmental data or a visual or audible locator. The magazine has a dispensing mechanism with a mechanical or electro-mechanical release mechanism that holds the repeater to be ejected in a substantially fixed position. The dispensing mechanism detects when the repeater switches to the active mode and dispenses the repeater in response thereto, as well as detecting the number repeaters remaining within the magazine and communicating this information.

21 Claims, 3 Drawing Sheets

WIRELESS COMMUNICATION SYSTEM, PORTABLE RADIO REPEATER AND MAGAZINE THEREFOR

This application is the national stage of international application Serial No. PCT/US2007/73420, filed on Jul. 13, 2007, which claims the benefit of priority to Great Britain Patent Application Serial No. 0614208.7, filed on Jul. 18, 2006 and which was granted as Great Britain Patent Serial No. 2440191 on Oct. 29, 2008. Both of these applications are assigned to Motorola, Inc. and herein incorporated by reference in their entirety.

FIELD OF THE INVENTION

This invention relates to a wireless communication system, a portable radio repeater and a portable magazine therefor. The invention is applicable to, but not limited to, radio repeaters operating in an emergency situation in a wireless communication system.

BACKGROUND

Wireless communication systems are distinguished over fixed communication systems, such as the public switched telephone networks (PSTN), principally in that subscriber units move between communication service areas and providers and in doing so encounter varying radio propagation environments. Therefore the quality of a communication link to/from a subscriber unit varies as the subscriber unit changes location. The subscriber units are typically either vehicular-mounted 'mobile' or 'hand-portable' radio or cellular units. Henceforth, the term mobile station (MS) will be used for all such subscriber units. Wireless communication systems, for example cellular telephony or private mobile radio communication systems, typically provide for radio telecommunication links to be arranged between a plurality of subscriber units.

In a private mobile radio (PMR) wireless communication system, there are typically two methods of communicating. A first communication method is a direct communication between two MSs. A second method uses one or more intermediary stations to forward the communication to a MS. The intermediary station may be a base transceiver station (BTS) connected to the communication system infrastructure. A BTS is generally considered an "intelligent" terminal, as it has the processing and control capability to influence a substantial amount of the communication traffic passing through it.

A further intermediary station is a radio repeater station, which performs a minimal amount of processing in receiving a communication and re-transmitting the received communication along the wireless communication path. As a repeater station has little control over the communication passing through it, it is often termed a "dummy" terminal.

Buildings, such as multi-story office blocks, warehouses and factories present particular problems for emergency personnel responding to a call. These problems include poor communications inside the building between the emergency team members and their supervisors, keeping track of the location of personnel inside the building, and navigating in the building under adverse conditions, such as fire or dense smoke.

A wide range of equipment has been used in the past, to facilitate communication in such adverse conditions both in fixed installations in buildings and as portable equipment brought in by the emergency services. Fixed equipment includes emergency telephones as an integral part of the fire alarm system, warden and stand pipe phones, Emergency Announcement systems, and radio repeater systems. Portable equipment includes both cellular phones, dedicated (Private) cellular networks such as iDEN™, and Handie-Talkie (HT) communication radios, such as the Motorola™ analog VHF 154 MHz Saber 1/1E or the digital UHF 800 MHz XTS 3500, and portable repeaters.

However, it has been found that under severe disaster conditions, such as terrorist attack or earthquakes, the building infrastructure may be damaged to such an extent that most if not all of these systems are either damaged beyond use, or become ineffective due to traffic overload.

For this reason, there has been significant research in recent years on systems to allow tracking and location of emergency personnel. In certain environments, use is made of Personal Location Beacons (PLB's) and Emergency Location Beacons (ELB's). These use a satellite tracking network which receives an emergency transmission at either 121.5 MHz or 406 MHz and automatically notifies the beacon's location. They have, however, been found to be ineffective in a closed/building environment.

Thus, a need exists for an improved wireless communication system, associated portable radio repeater and portable magazine therefor.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
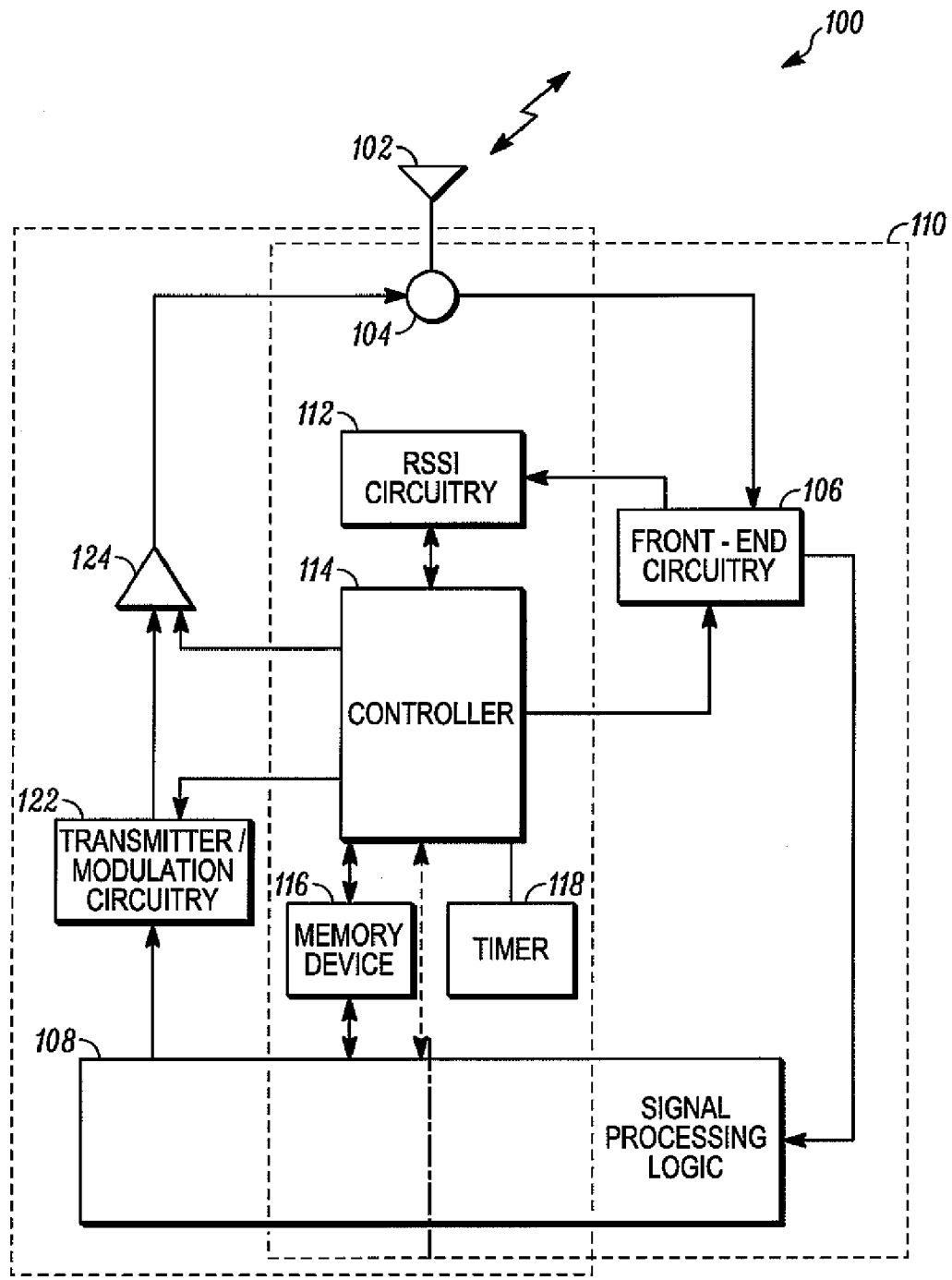
FIG. 1 is an example of a portable radio repeater in block diagram form in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a portable radio repeater, a portable magazine, and a radio communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the portable repeater or portable repeater magazine described herein. The non-processor circuits may include, but are not limited to, a radio receiver, a radio transmitter, signal drivers, clock circuits, power source circuits, and user input devices. As such, these functions may be interpreted as steps of a method to perform {replace with a technical description of the invention in a few words}.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In one embodiment of the present invention, a portable radio repeater comprises a transceiver operably coupled to a controller and received signal strength logic. The controller automatically switches between a passive receive mode of operation and an active transceiver mode of operation of the portable radio repeater in response to a received signal strength indication from the received signal strength logic.

In this manner, by provision of means to automatically switch between a passive receive mode of operation and an active transceiver mode of operation of a portable radio repeater, based on a received signal strength indication, a portable radio repeater network may be dynamically created when an emergency service person is traversing through an emergency site having adverse communication conditions.

In one embodiment of the present invention, a default mode of operation is the passive receive mode, such that when the received signal strength of at least one monitored signal falls below a defined threshold level, the radio repeater switches to the active transceiver mode and operates as a signal repeater for that received signal. The at least one monitored signal may be or comprise a beacon signal.

In one embodiment of the present invention, a further monitored signal may fall below a defined threshold level, such that the controller may be configured to automatically switch an operating mode of the portable radio repeater to an active transceiver mode for that further signal.

In one embodiment of the present invention, the portable radio repeater may comprise a cylindrical or spherical housing to facilitate ejection from a portable magazine. In one embodiment of the present invention, a switch may be integrated into the housing that is automatically switched on following passage along the portable magazine.

In the context of the present invention, the term 'portable magazine' may be understood to encompass any compartment in which items, such as portable radio repeaters according to embodiments of the present invention, are held ready to be released/ejected.

In one embodiment of the present invention, the portable radio repeater may comprise a locator, e.g., an optical device, such as a light emitting diode or an acoustic resonator or other acoustic device, located in the housing that is arranged to identify its location. In addition, a transmitter may be configured to continuously transmit a unique repeater identification (ID) of the portable radio repeater. In one embodiment of the present invention, an environmental sensor may be operably coupled to the transmitter and arranged to transmit environmental data wirelessly to further radio transceivers and/or a Command Center. The environmental data may be time-stamped and recorded locally by the portable radio repeater.

In one embodiment of the present invention, the housing of the portable radio repeater may be substantially spherical or cylindrical in form, and incorporate an integral substantially spherical or circumferential dipole antenna.

In one embodiment of the present invention, the housing of the portable radio repeater may comprise a guide projection for guiding the repeater when inserted into the magazine.

In one embodiment of the present invention, a portable magazine is arranged to eject at least one portable radio repeater contained therein.

In this manner, by provision of a portable magazine arranged to eject at least one portable radio repeater contained therein a portable radio repeater network may be dynamically created when an emergency service person is traversing through an emergency site having adverse communication conditions and portable radio repeaters may be ejected at suitable locations.

In one embodiment of the present invention, an ejection of a portable radio repeater is made in response to a receive signal strength indication measured by the portable radio repeater. The ejection of a portable repeater may be effected manually or automatically. In this manner, the portable radio repeater network may be dynamically created at optimal locations of one or more portable radio repeaters.

In one embodiment of the present invention, multiple portable radio repeaters are stored within the portable magazine, the portable magazine having at least one dispensing mechanism via which said portable radio repeaters are ejected from the portable magazine.

In one embodiment of the present invention, only one portable radio repeater of the multiple portable radio repeaters may be located within the dispensing mechanism. In this manner, ejection of portable radio repeaters may be controlled.

In one embodiment of the present invention, the dispensing mechanism may comprise a mechanical release mechanism whereby one portable radio repeater may be held in a substantially fixed position by the dispensing mechanism and may be ejected by means of the release mechanism as required.

In one embodiment of the present invention, the dispensing mechanism comprises an electro-mechanical release mechanism whereby one portable radio repeater may be held in a substantially fixed position by the dispensing mechanism and may be ejected by means of the electro-mechanical release mechanism (following automatic or manual activation) as required.

In one embodiment of the present invention, the dispensing mechanism may be provided with a mechanism for changing a mode of operation of one portable radio repeater from a standby mode to a passive mode.

In one embodiment of the present invention, the dispensing mechanism may comprise a radio signal detector capable of detecting when one portable radio repeater switches to an active mode of operation, and dispensing the portable radio repeater in response thereto.

In one embodiment of the present invention, a resilient mechanism attached to the portable magazine and arranged to impart a force on the at least one portable radio repeaters within the portable magazine, the resilient force acting substantially in the direction of the dispensing mechanism.

In one embodiment of the present invention, a protruding feature is provided and configured to a switch a portable radio repeater to a passive mode of operation when passing through the portable magazine.

In one embodiment of the present invention, a sensor is arranged to detect a number of portable radio repeaters remaining within the portable magazine, wherein the sensor is operably coupled to a transmitter for communicating the number of remaining portable radio repeaters to a Command Centre.

In one embodiment of the present invention, a radio communication network comprises a plurality of portable radio repeaters, at least one of which is a portable radio repeater that is automatically or manually ejected from a portable magazine in response to a received signal strength measurement and arranged to communicate from an ejected location.

One embodiment of the present invention will be described in terms of an emergency services radio repeater beacon network, a portable magazine for dispensing such portable radio repeaters, and a radio network utilising the aforementioned components. The portable radio repeaters, generally stored in the magazine, are ejected from the magazine as required. However, it will be appreciated by a skilled artisan that the inventive concept herein described may be embodied in any type of radio system utilising portable radio repeaters.

Furthermore, it is envisaged that the inventive concept is not limited to use in emergency radio systems. It is envisaged that the inventive concept herein described may equally be applied to any radio system intended for use in harsh environments or in adverse communication conditions.

Referring now to FIG. 1, a block diagram of a portable radio repeater 100, adapted to support the inventive concept of embodiments of the present invention, is illustrated. The portable radio repeater 100 contains an antenna 102 preferably coupled to a duplex filter or antenna switch 104 that provides isolation between a receiver chain 110 and a transmitter chain 120 within the Repeater unit 100. As known in the art, the receiver chain typically includes receiver front-end circuitry 106 (effectively providing reception, filtering and intermediate or base-band frequency conversion). The front-end circuit is serially coupled to a signal processing logic 108. In a portable radio repeater 100, the signal processing logic 108 typically performs a minimum of signal processing activities, such as, decoding, demodulating.

The receiver chain may include received signal strength indicator (RSSI) circuitry 112 (shown coupled to the receiver front-end 106, although the RSSI circuitry 112 could be located elsewhere within the receiver chain). Signal strength may vary within certain limits. To eliminate false repeater dropping, in one embodiment of the present invention, the signal strength may be measured over a time period, with a signal strength decision made using an intelligent algorithm within the signal processor logic 108. The RSSI circuitry is coupled to a controller 114. In this way, the controller 114 may therefore receive bit error rate (BER) or frame error rate (FER) data from recovered information, to determine which supported MSs are able to transmit/receive signals of a sufficiently high level to facilitate communications. The controller 114 is also coupled to the receiver front-end circuitry 106 and the signal processing logic 108 (generally realised by a digital signal processor (DSP)). The controller 114 is coupled to the memory device 116 for storing operating regimes, such as decoding/encoding logic and the like. A timer 118 is typically coupled to the controller 114 to control the timing of operations (transmission or reception of time-dependent signals) within the portable radio repeater 100.

As regards the transmit chain 120, this essentially includes a transmitter/modulation circuit 122 that is used to re-format (modulate, encode, etc.) received signals for re-transmission. Thereafter, any transmit signal is passed through a power amplifier 124 to be radiated from the antenna 102. The transmitter/modulation circuitry 122 and the power amplifier 124 are operationally responsive to the controller, with an output from the power amplifier 124 coupled to the duplex filter or antenna switch 104. The transmitter/modulation circuitry 122 and receiver front-end circuitry 106 comprise frequency up-conversion and frequency down-conversion functions (not shown).

Figure 2:
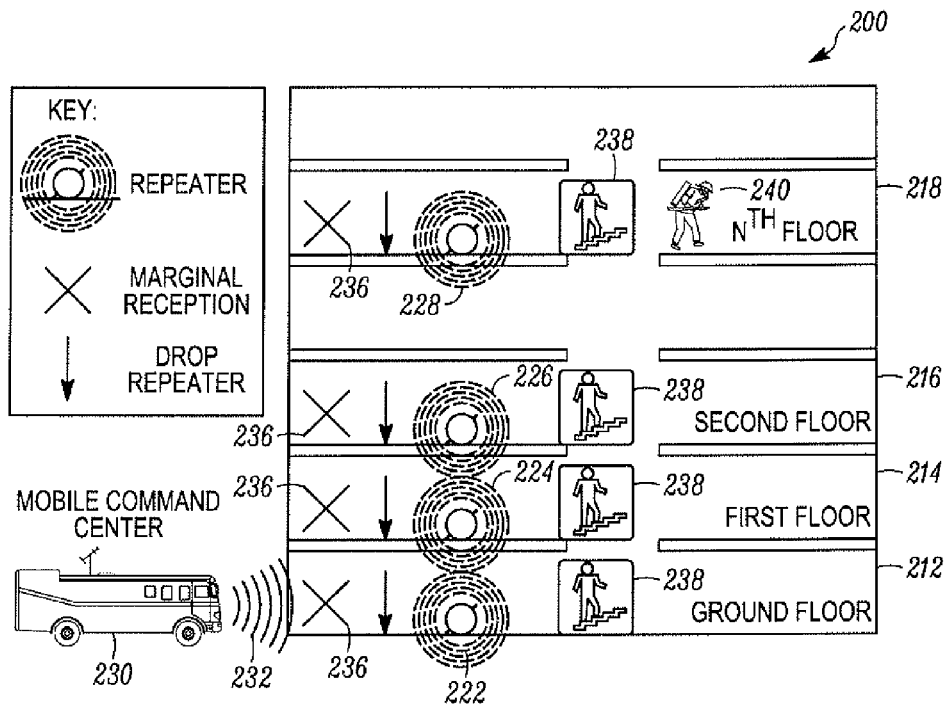
FIG. 2 is an example of a vertical section of a multi-story building.

FIG. 2 shows, diagrammatically, a cross section of a multi-story building 200 and a number of portable radio repeaters 228, 226, 224, 222 in accordance with one embodiment of the invention. FIG. 2, in effect, illustrates a typical example situation/scenario of where and how the inventive concept herein described may be used. Also illustrated in FIG. 2 are areas of marginal radio reception 236, stairways 238 between floors, and an emergency service worker 240. A mobile command centre 230 having radio communication 232 with the radio units 222, 224, 226, 228 is also shown. The command centre, used to coordinate the activities of the service personnel 240, is located outside the building 200.

Figure 3:
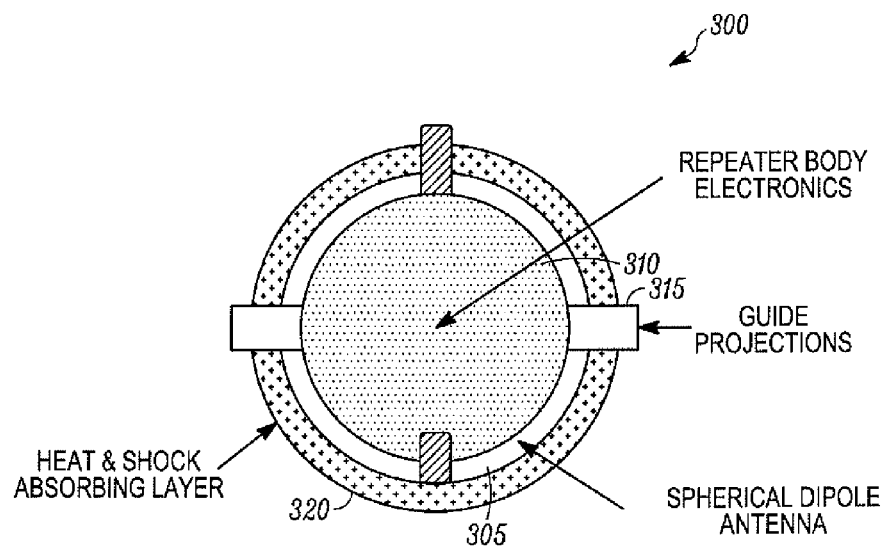
FIG. 3 is an example of a structure of a portable radio repeater in accordance with embodiments of the invention.
Figure 4:
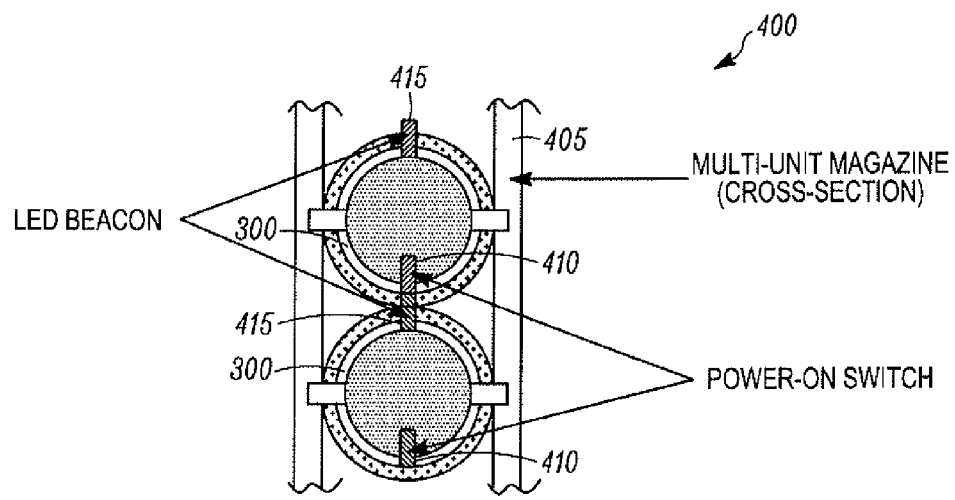
FIG. 4 is an example of a section of a portable magazine in accordance with embodiments of the invention.
Figure 5:
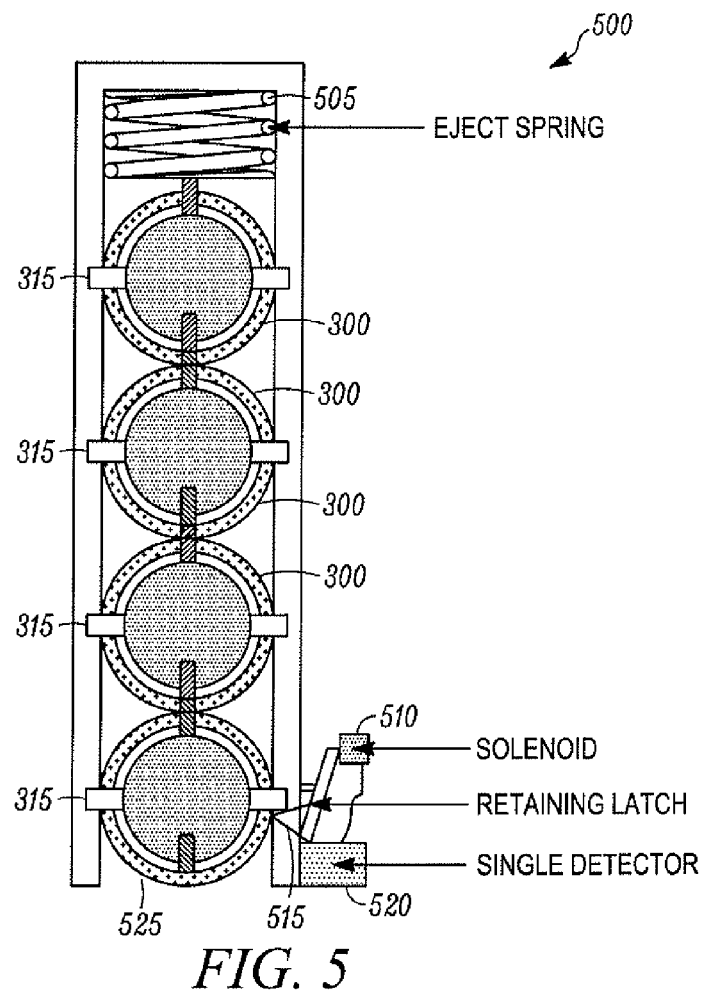
FIG. 5 illustrates the structure of a portable magazine in accordance with embodiments of the invention.

FIG. 3 illustrates a vertical section through a ruggedized portable radio repeater 300 according to one embodiment of the present invention. The portable radio repeater 300 shown is substantially spherical in form, and comprises a rugged outer housing 320, designed to protect the inner volume from damage due to temperature, shock, water and/or other environmental hazards. The outer housing 320 incorporates beneficially further mechanical guide projections, 315 that are used to locate the portable radio repeater in a portable magazine 405, 500 as illustrated in FIG. 4 and FIG. 5.

The mechanical guide projections 315 are also utilized in conjunction with further mechanical arrangements 510, 515, 520, in a process of ejecting repeaters from the portable magazine 405, 500.

The portable radio repeater 300 has an internal enclosed volume 310 protected by the outer housing 320 and a further inner shell, within which are located sensitive electronic systems required for operation of the portable radio repeater. The shell enclosing the inner volume has advantageously a dual purpose, in that it is both a container for the sensitive electronics, such as the signal processing and radio frequency circuits and a spherical dipole antenna 305 for radio transmission.

A further advantageous characteristic of the portable radio repeater 300 is that it supports multiple operating modes. The portable radio repeater 300 has an off-mode (when in storage), at least one power saving standby mode, one passive (default) mode of operation in which it monitors signals of interest transmitted on specific radio frequencies, and one active transceiver (Rx/Tx) mode of operation, in which it acts as a radio repeater for one or more of the radio signals of interest.

Advantageously, the portable radio repeater 300 is also capable of switching between these modes of operation, as required by the actual operating conditions.

In one embodiment of the present invention, the portable magazine 405 is arranged to react to a transmit power level of the activated portable radio repeaters 300. For example, it is envisaged that low charged portable radio repeaters 300 may be treated as malfunctioning repeaters and, as such, simply ejected to let fully functional repeater become operated. Alternatively, it is envisaged that an activated portable radio repeater 300 may report its transmit power level capability to the portable magazine 405.

It is further envisaged that the transmit power level capability of a portable radio repeater 300 may be reported to an emergency worker and/or Command Center. For example, it is envisaged that the transmit power level capability may be an additional parameter that may be reported periodically to the Command Center. In this manner, the Command Center may determine that when the transmit power level of a particular portable radio repeater 300 falls below a pre-defined threshold, the portable radio repeater 300 should be replaced to maintain communication across the radio network. Furthermore, it is envisaged that such transmit power level capabilities may be checked when an emergency worker takes the portable magazine 405 from storage.

Beneficially, the portable radio repeater 300 monitors the signal strength of a signal, say radio signal 232 of FIG. 2, and when the signal level drops below a pre-defined threshold as identified by the RSSI circuitry 112 in FIG. 1, the controller 114 (i.e. in conjunction with signal processing logic 108) switches the portable radio repeater operating mode from a passive mode to an active 'repeater' mode. The portable radio repeater 300 then amplifies and re-transmits the received radio signal 232.

Advantageously, the portable radio repeater 300 is able to process multiple radio signals 232 on different operating frequencies, acting as a repeater for one while monitoring further signals on other radio frequencies. At the point when a second or further signal falls below a set threshold, the portable radio repeater 300 is configured to function as a repeater for this further frequency.

Beneficially, in accordance with one embodiment of the invention, one or more environmental sensors are integrated within the body 310 of the portable radio repeater 300. The one or more sensors (not shown) are operably coupled to the controller 114 and/or signal processing logic 108 of FIG. 1. The sensors, such as temperature, humidity, pressure or other environmental sensors, allow the portable radio repeater to modify its operating mode based on its current environment.

Advantageously, the portable radio repeater 300 may also wirelessly transmit data gathered from its environmental sensors to other nodes on the wireless network, thus making the information available to other users on the network as well as the Command Center.

This data may also, in one embodiment, beneficially, be time-stamped by the portable radio repeater in order to allow data from separate repeaters to be collated and time-correlated for analysis. The portable radio repeater 300 may also include, advantageously, a memory device such as a flash memory or electrically erasable programmable read-only memory (EEPROM) or other writable memory device, in which environmental data may be recorded for subsequent analysis. This allows the usage of bandwidth to be controlled by the repeater, in that, for example, it may be configured to transmit environmental data only when network traffic is low.

Advantageously, the external housing 320 of the portable radio repeater 300 may have one or more substantially flat surfaces, thus allowing a portable radio repeater to remain stationary on a floor or be placed stably on a flat surface. The portable radio repeater may also advantageously be cylindrical in shape thus allowing an increase in the volume of the portable radio repeater and allowing other antenna geometries to be used. Beneficially, protruding mechanical structures such as the guide projections 315 may also be designed such as to assist in physically anchoring the portable radio repeater in position once ejected or deposited.

Referring now to FIG. 4, a structure 400 of a section of a portable magazine arranged to hold one or more portable radio repeaters 300 is illustrated.

A further advantageous feature of the portable radio repeater 300 according to one embodiment of the invention is the presence of a power switch 410 integrated within the external rugged housing 320, or within the guide projections 315. The switch 410 allows the portable radio repeater to be switched on only when required. This feature saves battery power while the repeater is being stored in the portable magazine, and thus substantially increases its active operational time.

The portable radio repeater 300, in one embodiment, also includes beneficially a visible output device such as a light emitting diode (LED) beacon 415 and/or an audible acoustic resonator (not shown) or similar sound generating device. One or both of these devices may be used by an operator to physically locate an ejected portable radio repeater.

The portable radio repeater 300 may also advantageously wirelessly transmit a unique identifier, thus allowing all deployed portable radio repeaters to be remotely and independently monitored 230.

As can be seen in FIG. 4, the portable radio repeater 300 in one embodiment of the invention is provided with a power-on switch 410, located on the outer housing of the repeater. The switches are positioned such that, when located within the portable magazine 400, the ejection force pushes the portable radio repeaters together, and causes each power switch 410 to be held in the off position, except for that of the one portable radio repeater in the dispensing mechanism.

In this manner, it is possible to ensure that the portable radio repeater that finds itself moving into the ejection position is automatically switched on by the act of ejecting the last repeater 300.

Besides the standard repeater functionality, the portable radio repeater 300 may also include a low power beacon transmitting a unique ID, as well as a flashing high-efficiency, high brightness LED beacon 415 and a high level acoustic resonator. These are all intended to both assist in locating personnel and how they are moving in the building, as well as allowing the radio repeaters 300 to be retrieved during site evacuation or clearance. In addition, the portable radio repeater 300 may contain a variety of environmental and life sign sensors thereby enabling transmission of critical data to the Command Center. It is envisaged that one or more of the aforementioned portable radio repeater 300 locating embodiments may be implemented on the portable magazine 405 itself or via another apparatus.

Furthermore, in one embodiment of the present invention, it is envisaged that portable radio repeater 300 may comprise a passive radio frequency identifier (RFID) tag or similar mechanism. In this manner, the portable radio repeater 300 may be located a period of time after the emergency event, even when the battery level of the portable radio repeater 300 is low and any radiated signal is poorly sensed.

Referring now to FIG. 5, a portable magazine 500 for storing multiple portable radio repeaters 300 according to one embodiment of the present invention is illustrated. The portable magazine 500 advantageously holds multiple portable radio repeaters 300 and has at least one dispensing mechanism 510, 515, 520 and at least one ejection opening 525, via which portable radio repeaters 300 may be ejected from the portable magazine 500.

The ejection opening 525 and dispensing mechanism 510, 515, 520 are designed such that only one portable radio repeater may be located within the dispensing mechanism at any time. The portable radio repeater 300 may also be advantageously held in a fixed position and orientation by the ejection mechanism, which may be of a mechanical, an electro-mechanical or of any other suitable construction. Thus, aside from a failure of the mechanism 510, 515, 520, it is impossible for two portable radio repeaters 300 to be ejected simultaneously.

In one embodiment of the present invention, a mechanism (not shown) of the portable magazine may be capable of causing a portable radio repeater entering the dispensing mechanism, to switch from standby-mode to passive-mode. Again, it is envisaged that this mechanism may be of electrical or electro-mechanical design. The portable radio repeater may then, advantageously, begin its start-up process, for example to monitor specific wireless signals, while still located in the dispensing mechanism and being transported to its destination.

Advantageously, the portable magazine 500 may incorporate a further means of monitoring signals generated by the one portable radio repeater located within the dispensing mechanism. That is, the portable magazine monitoring means may be configured to detect when the portable radio repeater switches from the passive to the active mode of operation. If a transmission is detected on one or more pre-defined frequencies, the mechanism may cause the portable radio repeater to be ejected automatically.

The portable magazine may, advantageously, contain a mechanism for automatically ejecting a portable radio repeater 300, such as the spring mechanism 505 shown in FIG. 5. The force generated by the compressed spring 505 acts on the portable radio repeaters within the cylindrical magazine housing 530, causing the bottom-most portable radio repeater to be ejected when the dispensing mechanism 510, 515, 520 is activated, and the retaining latch 515 released.

This requisite force could be generated in many ways, as would be appreciated by a skilled artisan, the spring 505 being a simple and low cost example.

The portable magazine 500 according to one embodiment of the invention may also incorporate a further means of manually activating the ejection mechanism 510, 515, 520, and ejecting a portable radio repeater, for example using a manual lever mechanism.

A further beneficial sensor (not shown) may also be provided within the portable magazine 500 that is arranged to detect the number of portable radio repeaters left within the portable magazine. The sensor may communicate this information, via a further wireless transmitter of the portable magazine, to a Command Center. This further sensor may, in alternative embodiments, comprise optical, acoustical, or any other suitable communication means.

A yet further advantageous feature of the portable radio repeater 300, according to one embodiment of the invention, is the ability to monitor a separate beacon signal and set its operating mode according to the received strength of the beacon signal, or some specific command information contained in the beacon signal. In this manner, it is possible to re-configure already deployed repeaters in order to respond to a changing situation on the ground.

Thus, in operation, the portable radio repeaters 300 are loaded into a portable multi-unit magazine 500, which is carried by a user, such as an emergency service worker 240. The emergency service worker, a fireman in the example of FIG. 2, enters a building 200 and moves away from the central command unit 230. Radio signals 232 transmitted by the command unit, are monitored by the portable radio repeater 300, located in the ejection position of the portable magazine 500. When the user moves into a location 236 where the signal strength falls below a trigger level, the repeater switches to an active repeat mode, and is automatically ejected from the portable magazine 500.

In this manner, the first portable radio repeater 300 in the portable magazine 500 is ejected automatically when the received signal strength drops below a pre-determined threshold. The ejected portable radio repeater, which was in passive mode and configured to monitor received signal strength, now switches into full power normal repeater mode, transmitting/receiving signals to the next portable radio repeater 300 in the portable magazine 500 as well as other mobile/portable units in its vicinity. A detector located within the portable magazine detects this switch over and ejects the portable radio repeater 300.

The portable radio repeater 300 then remains in this location acting as a booster for the signals 232 generated by the Command centre 230 or relayed by a previously ejected portable radio repeater. This process repeats itself each time the received signal strength at the users' current location falls below the threshold level.

Thus, when the signal strength from the entire network, which may well be the last (previously ejected) portable radio repeater, falls below a given threshold, as the user moves through the building, a further portable radio repeater 300 is automatically ejected out of the portable magazine 500. In this manner, portable radio repeaters are automatically placed (ejected) at locations where the radio coverage is weak.

As each portable radio repeater 300 is ejected, it switches the next portable radio repeater 300 in the portable magazine from off-mode to standby mode to a passive mode whereby the portable radio repeater in turn starts monitoring received signal strength. This process continues automatically until all the portable radio repeaters 300 in the portable magazine 500 have been ejected.

In one embodiment of the present invention, the portable radio repeater 300 may be ball-shaped to provide improved strength and sealing. The portable radio repeater 300 may also be padded with some heat and shock absorbing material, and may use a spherical dipole antenna 305. Two projections 315 may be molded in to the portable radio repeater 300, on opposing sides, to act both as a guide for retention, and assist ejection from the portable magazine 500. Advantageously, this feature also reduces the distance traveled by the portable radio repeater after having been ejected, e.g. preventing the portable radio repeater 300 from rolling too far once it hits the ground.

The multi-unit portable magazine 500 may comprise a spring 505, which presses the portable radio repeaters against a retaining latch 515 at the open end 525 of the portable magazine 500. The retaining latch 515 may be released, for example by a solenoid 510 operated by a small battery operated detector 520 on the portable magazine 500. The battery-operated detector 520 detects the repeater transmission as it switches into full power mode. By limiting the range of the battery-operated detector 520, the detector 520 may only be triggered by the portable radio repeater 300 in the portable magazine 500 switching itself on, and not by any already energized and ejected portable radio repeater 300.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It is envisaged that the aforementioned inventive concept may be used in many applications, such as used by minors, speleologists and rescue personnel operating in a field (cave or underground) environment. Thus, the inventive concept finds particular applicability when there is no existing communication network or the existing communication network is in danger of becoming overloaded in, say, an emergency situation. It is further envisaged that the inventive concept may be usefully deployed when installed on a transportation unit (for example, an all-terrain vehicle, a tank, desert tractor, etc.) when the unit is moving through a virgin communication environment and/or extending the existing communication network.

It will be appreciated that any suitable distribution of functionality between different logical units may be used without detracting from the inventive concept herein described. Hence, references to specific logical devices or elements are only to be seen as references to suitable means for providing the described functionality, rather than indicative of a strict logical or physical structure or organization.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved wireless communication system, portable radio repeater and portable magazine therefor have been described, wherein the aforementioned disadvantages with prior art arrangements have been substantially alleviated.

The invention claimed is:

1. A wireless communication system comprising a plurality of portable radio repeaters, wherein at least one of the portable radio repeaters is operable to be automatically or manually ejected from a portable magazine in response to a received signal strength measurement and is arranged to communicate from an ejected location.

2. The wireless communication system of claim 1, wherein the at least one of the portable radio repeaters comprises:
   a transceiver;
   a controller; and
   received signal strength logic, wherein:
   the transceiver is operably coupled to the controller and to the received signal strength logic; and
   the controller automatically switches between a passive receive mode of operation and an active transceiver mode of operation of the portable radio repeater in response to a received signal strength indication.

3. The wireless communication system of claim 2, wherein:
   a default mode of operation of the at least one of the portable repeaters is the passive receive mode, and when a received signal strength indication of at least one monitored signal falls below a defined threshold level, the at least one of the portable radio repeaters switches to the active transceiver mode and operates as a signal repeater for the at least one monitored signal; and
   when a further monitored signal falls below the defined threshold level, the controller automatically switches the operating mode of the at least one of the portable radio repeaters to the active transceiver mode for the further signal.

4. The wireless communication system of claim 2, wherein:
   the at least one of the portable radio repeaters includes one of a cylindrical housing or a spherical housing to facilitate ejection from the portable magazine;
   the at least one of the portable radio repeaters further comprises:
   a switch integrated into the one of the cylindrical or spherical housing that is automatically switched on following passage along the portable magazine; and
   a locator located in the one of the cylindrical or spherical housing and arranged to identify a location of the at least one of the portable radio repeaters, wherein the locator comprises one of:
   (i) a light emitting diode; or
   (ii) an acoustic resonator.

5. The wireless communication system of claim 2, wherein the at least one of the portable radio repeaters further comprises an environmental sensor operably coupled to the transmitter and arranged to transmit environmental data wirelessly to at least one of other radio transceivers or to a Command Center.

6. The wireless communication system of claim 5, wherein the environmental data is time-stamped and is recorded locally by the at least one of the portable radio repeaters.

7. The wireless communication system of claim 4, wherein the one of the cylindrical or spherical housing of the at least one of the portable radio repeaters:
   incorporates an integral dipole antenna that is substantially spherical or circumferential; and
   comprises a guide projection for guiding the repeater when inserted into the magazine.

8. The wireless communication system of claim 1, further comprising the portable magazine, wherein the portable magazine is arranged such that:
   ejection of the at least one of the portable radio repeaters is made in response to a receive signal strength indication measured by the at least one of the portable radio repeaters; and multiple portable radio repeaters are stored within the portable magazine, the portable magazine having at least one dispensing mechanism via which the at least one of the portable radio repeaters is ejected from the portable magazine.

9. The wireless communication system of claim 8, wherein:
only one portable radio repeater of the multiple portable radio repeaters is located within the dispensing mechanism; and
the dispensing mechanism comprises one of:
a mechanical release mechanism whereby the only one portable radio repeater is held in a substantially fixed position by the dispensing mechanism and is ejected by means of the mechanical release mechanism as required; or
an electro-mechanical release mechanism whereby the only one portable radio repeater is held in a substantially fixed position by the dispensing mechanism and is ejected by means of the electro-mechanical release mechanism as required.

10. The wireless communication system of claim 8, wherein:
the dispensing mechanism is provided with a mechanism for changing a mode of operation of the at least one of the portable radio repeaters from a standby mode to a passive mode;
the dispensing mechanism comprises a radio signal detector capable of detecting when the at least one of the portable radio repeaters switches to an active mode of operation, and dispensing the at least one of the portable radio repeaters in response thereto; and
the portable magazine comprises at least one of:
a resilient mechanism attached to the portable magazine and arranged to impart a force on the at least one of the portable radio repeaters within the portable magazine, the resilient force acting substantially in the direction of the dispensing mechanism;
a protruding feature configured to a switch the at least one of the portable radio repeaters to a passive mode of operation when passing through the portable magazine; and
a sensor arranged to detect a number of the portable radio repeaters remaining within the portable magazine, wherein the sensor is operably coupled to a transmitter for communicating the number of remaining portable radio repeaters to at least one of a Command Center or an Operator carrying the portable magazine.

11. A method in a wireless communication system comprising a portable radio repeater and a portable magazine, the method comprising:
receiving a signal of interest;
determining whether a signal strength of the signal has dropped below a predetermined threshold; and
if it is determined that the signal strength has dropped below the threshold, at least one of:
automatically ejecting the repeater from the magazine, or
providing an indication on the magazine to an operator carrying the magazine that the repeater is to be manually ejected from the magazine;
wherein the ejected repeater wirelessly acts as a radio repeater for the signal of interest.

12. The method of claim 11, wherein:
the receiving comprises the repeater in the magazine receiving the signal of interest, and
the determining comprises the repeater in the magazine determining whether the signal strength has dropped below the threshold.

13. The method of claim 12, further comprising the repeater in the magazine automatically switching between a passive receive mode in which the repeater monitors the signal and an active mode in which the repeater transmits the signal in response to the repeater determining that the signal strength has dropped below the threshold.

14. The method of claim 13, wherein the automatic ejection comprises the magazine detecting transmission of the signal from the repeater in the magazine and ejecting the repeater in response thereto, the detection being limited to detecting transmission of the signal from the repeater in the magazine.

15. The method of claim 13, further comprising, when the repeater is in the active mode, at least one of:
activating at least one of a visual or audible signal in the repeater, or
transmitting environmental data wirelessly from the repeater to a radio transceiver or to a Command Center.

16. The method of claim 11, wherein the signal is emitted by a previously-ejected repeater.

17. The method of claim 11, further comprising storing a plurality of repeaters within the magazine and limiting ejection of the repeaters to only one of the repeaters at a time.

18. The method of claim 11, further comprising:
storing a plurality of repeaters within the magazine;
providing a power switch on an outer housing of each repeater; and
positioning the repeaters in the magazine such that the power switch of each repeater, except for a next repeater to be ejected, is held in an off position by an ejection force such that the repeaters in the magazine.

19. The method of claim 11, further comprising:
storing a plurality of repeaters within the magazine;
detecting a number of the repeaters remaining within the magazine; and
communicating the number of remaining repeaters to at least one of a Command Center or the operator carrying the magazine.

20. The method of claim 11, further comprising using guide projections on the repeater to locate the repeater in the magazine, eject the repeater, and anchor the repeater after ejection.

21. The method of claim 11, further comprising the ejected repeater monitoring a beacon signal and resetting an operating mode of the repeater dependent on at least one of the received strength of the beacon signal or specific command information contained in the beacon signal.

* * * * *

UNITED STATES PATENT AND TRADEMARK OFFICE
CERTIFICATE OF CORRECTION

| | | |
|---|---|---|
| PATENT NO. | : 8,019,278 B2 | |
| APPLICATION NO. | : 12/373323 | |
| DATED | : September 13, 2011 | |
| INVENTOR(S) | : Baraz et al. | |

It is certified that error appears in the above-identified patent and that said Letters Patent is hereby corrected as shown below:

In Column 12, Line 18, in Claim 3, delete "portable repeaters" and insert -- portable radio repeaters --, therefor.

Signed and Sealed this
Eighth Day of January, 2013

David J. Kappos
*Director of the United States Patent and Trademark Office*